(12) United States Patent
Mordvinov

(10) Patent No.: US 8,935,273 B2
(45) Date of Patent: Jan. 13, 2015

(54) METHOD OF PROCESSING AND DECOMPOSING A MULTIDIMENSIONAL QUERY AGAINST A RELATIONAL DATA SOURCE

(75) Inventor: Vladimir Mordvinov, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 1886 days.

(21) Appl. No.: 11/159,742

(22) Filed: Jun. 23, 2005

(65) Prior Publication Data

US 2006/0294087 A1 Dec. 28, 2006

(51) Int. Cl.
*G06F 17/30* (2006.01)

(52) U.S. Cl.
CPC .... *G06F 17/30592* (2013.01); *G06F 17/30439* (2013.01)
USPC .......................................... 707/759; 707/802

(58) Field of Classification Search
USPC ....................................... 707/1–10, 759, 802
See application file for complete search history.

(56) References Cited

U.S. PATENT DOCUMENTS

| 6,609,123 B1 * | 8/2003 | Cazemier et al. ................. 707/4 |
| 6,865,567 B1 * | 3/2005 | Oommen et al. ................. 707/2 |
| 2002/0091681 A1 | 7/2002 | Cras et al. |
| 2003/0093424 A1 * | 5/2003 | Chun et al. ........................ 707/7 |
| 2004/0133552 A1 * | 7/2004 | Greenfield et al. ............... 707/1 |
| 2005/0033741 A1 * | 2/2005 | Dombroski et al. ............. 707/3 |
| 2006/0218157 A1 * | 9/2006 | Sourov et al. ................ 707/100 |

* cited by examiner

*Primary Examiner* — Hosain Alam
*Assistant Examiner* — Navneet K Ahluwalia
(74) *Attorney, Agent, or Firm* — Shumaker & Sieffert, P.A.

(57) ABSTRACT

A multidimensional operation provider is provided for processing a multidimensional query against a relational datasource. The multidimensional operation provider comprises a query interceptor, a query decomposer and a query replacer. The query interceptor detects and intercepts a multidimensional query that is issued against one or more relational data sources. The query decomposer decomposes expressions of the multidimensional query into one multidimensional expression and/or one or more relational expressions. The query replacer replaces the multidimensional query with a stack of operations expressed by the decomposed multidimensional expressions and/or the relational expressions.

26 Claims, 4 Drawing Sheets

METHOD OF PROCESSING AND DECOMPOSING A MULTIDIMENSIONAL QUERY AGAINST A RELATIONAL DATA SOURCE

FIELD OF INVENTION

The present invention relates to a system and method for processing high level user requests containing one or more queries, and especially to a system and method for processing and decomposition of a multidimensional query against a relational data source.

BACKGROUND OF THE INVENTION

Many organizations use data stores for storing business data, such as financial data and operational data. In order to assist business users to examine their data, various data analyzing applications are proposed. Those data analyzing applications provide various views or reports of data to users. Those data analyzing applications typically have query engines that access the data stores to obtain desired data.

Some data analyzing applications have Online Analytical Processing (OLAP) query engines to allow users to analyze multidimensional views of data. This type of OLAP is sometimes called Multidimensional OLAP (MOLAP). A MOLAP engine summarizes business data into multidimensional views in advance, and places the summarized data in a cube structure. When a user request is received, the MOLAP engine accesses the summarized data, and thus the MOLAP engine can provide a response to the query very fast. The user can rotate the cube structured data to see a desired view of the data using the MOLAP engine.

There also exist Relational OLAP (ROLAP) query engines that extract data from traditional relational databases. ROLAP engines are able to create multidimensional views on the fly. In order to extract data, those ROLAP engines typically use complex Structured Query Language (SQL) statements against relational tables in the relational databases. ROLAP engines tend to be used on data that has a large number of attributes, where the data cannot be easily placed into a cube structure. ROLAP engines support multidimensional queries issued against relational databases. Some ROLAP engines translate OLAP queries into SQL queries, and other ROLAP query engines implement the access to relational databases using internal communication between components responsible for OLAP and relational operations.

Both MOLAP and ROLAP approaches to the multidimensional data access, even though they use different data storage technologies, provide only the functionality of the multidimensional query language.

On the other side is the relational query language, SQL, providing powerful set of operations manipulating data in accordance with the relational algebra. While SQL is ideal for processing transactional data, it has a number of significant limitations when it comes to data analysis and reporting.

In view that both multidimensional and relational technologies have different advantages, it is desirable to converge those technologies. However, there has been no mechanism proposed to converging of multidimensional and relational technologies.

SUMMARY OF THE INVENTION

The present invention intercepts a multidimensional query that issued against one or more relational data sources, and decomposes it into sub-queries to execute the query.

It is an object of the invention to provide an improved system and method for decomposition of a query against one or more relational data sources.

In accordance with an aspect of the present application, there is provided a method of processing a multidimensional query against one or more data source. The method comprises detecting and intercepting a multidimensional query that is issued against one or more relational data sources, the multidimensional query involving one or more multidimensional expressions; identifying one or more tabular sub-expressions in the multidimensional query; extracting information of one or more tabular data items corresponding to the one or more tabular sub-expressions; creating a cube item in a dynamic cube for each of the one or more tabular data items based on the information; and replacing the one or more tabular sub-expressions in the multidimensional query with one or more reference to one or more cube items created by the cube item to generate a decomposed sub-query.

In accordance with another aspect of the present application, there is provided a method of decomposing a multidimensional query applied against one or more relational data sources. The method comprises identifying one or more parts of expressions in a multidimensional query as one or more tabular sub-expressions that are supported by a relational query provider that is capable of executing relational queries, the multidimensional query involving one or more multidimensional expressions; extracting information of one or more tabular data items corresponding to the one or more tabular sub-expressions; creating a cube item in a dynamic cube for each of the one or more tabular data items based on the information; and replacing the one or more tabular sub-expressions in the multidimensional query with one or more references to one or more cube items created by the cube item to generate a decomposed sub-query.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

Figure 1:
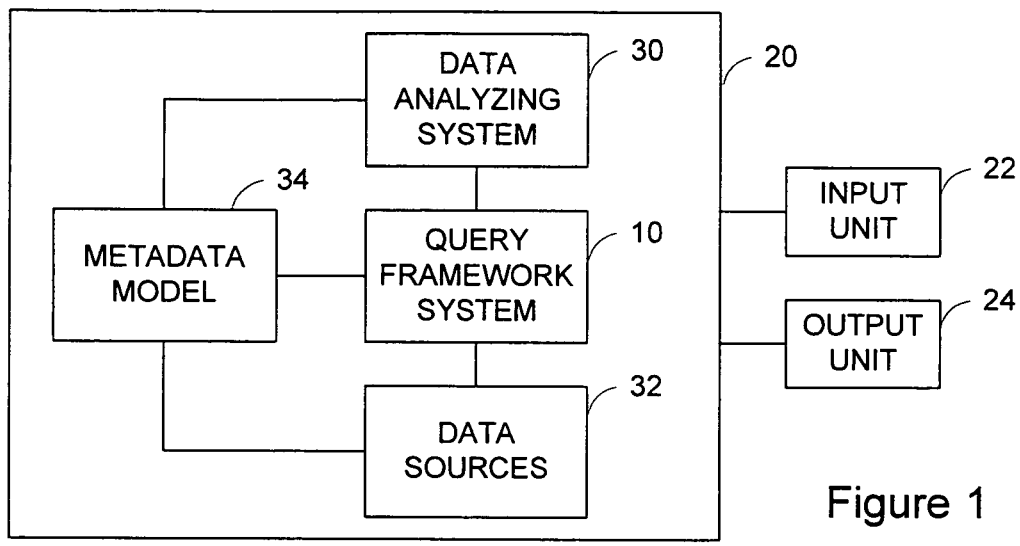
FIG. 1 is a block diagram showing a query framework system in which a multidimensional operation provider in accordance with an embodiment of the present invention is suitably used.
Figure 2:
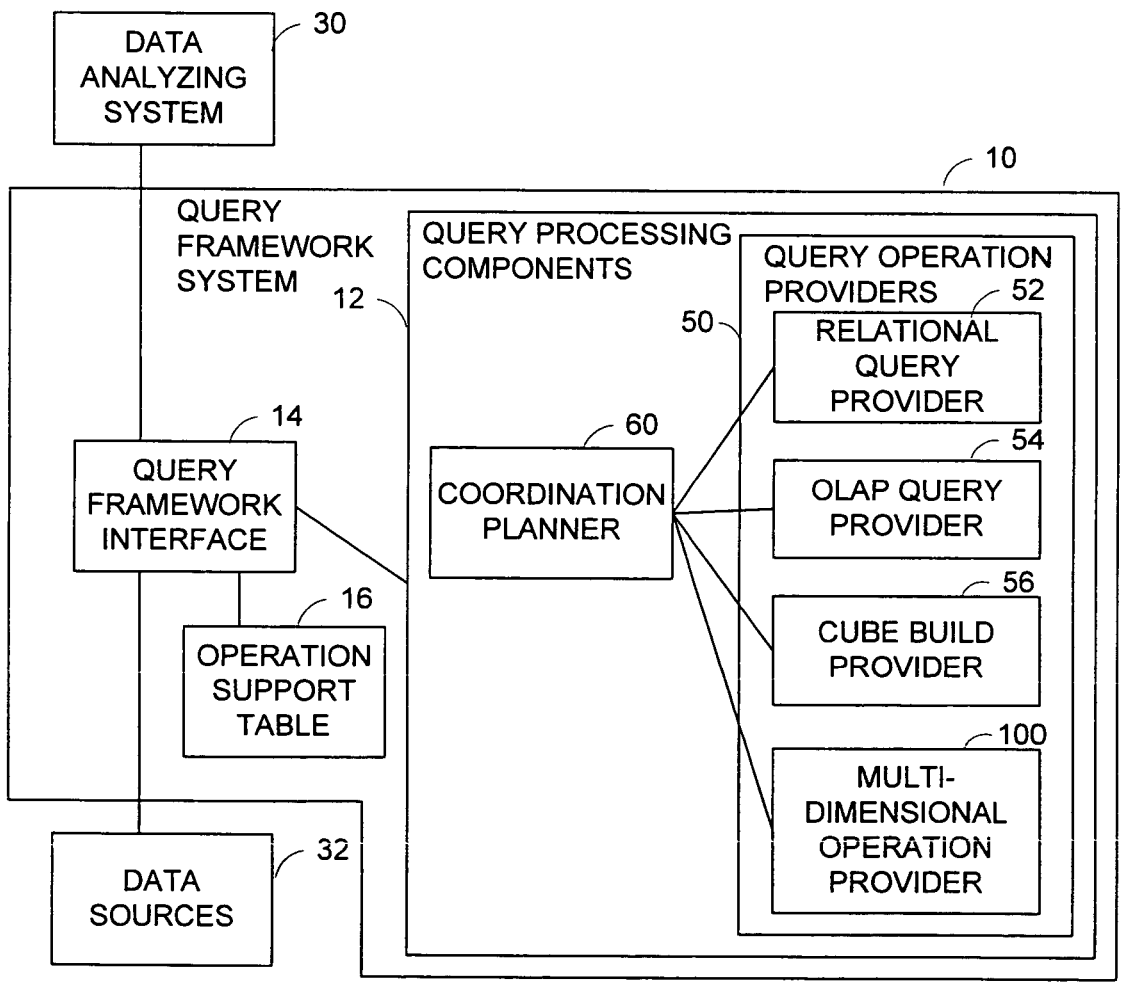
FIG. 2 is a block diagram showing the query framework system.

FIGS. 1 and 2 show a query framework system 10 in which a multidimensional operation provider 100 (FIG. 2) in accordance with an embodiment of the application is suitably used. The multidimensional operation provider 100 may be a standalone pluggable component as shown in FIG. 2, or a part of a component that processes high level user requests. The following descriptions describe an embodiment of the multidimensional operation provider as a standalone component, but the invention is not limited to such an embodiment.

The query framework system 10 is used in a computer system 20 having an input unit 22 and an output unit 24. The query framework system 10 is provided to receive user requests from a data analyzing system 30 and process the received user requests to retrieve requested data from one or more data sources 32.

The data analyzing system 30 is an application that provides various views of data in the data sources 32 to allow users to analyze the data. When a user requests a view of data, the data analyzing system 30 generates a user request. A user request typically contains multiple queries. To generate user requests, the data analyzing system 30 may use a metadata model 34 that contains metadata of the data sources 32. The user request is in a query language that the data analyzing system 30 uses to issue the user request. Some data analyzing system 30 may issue a user request in a data source language, such as SQL, and some data analyzing system 30 may issue a user request in a language specific to the data analyzing system 30.

The data analyzing system 30 issues user requests in a data agnostic querying language or specification. The data agnostic querying specification allows combining query elements involving relational operations and OLAP operations. Accordingly, a multidimensional query issued by the data analyzing system 30 may involve both relational and OLAP operations, only relational operations, or only OLAP operations in respect of the multidimensional operations.

The query framework system 10 intercepts user requests generated by the data analyzing system 30. It processes and executes the user requests to retrieve desired data from the data sources 32.

As shown in FIG. 2, the query framework system 10 has multiple query processing components 12. Query processing components 12 share a common interface 14 and a common query language of the query framework system 10. Query processing components 12 are pluggable components. Query processing components 12 include a set of query operation providers 50, and a coordination planner 60. The query framework system 10 may also have an operation support table 16 that describes functionalities of the query operation providers 50.

The coordination planner 60 organizes interaction between the query processing components 12. The interaction is carried out through the common interface 14 and based on the common query language. The coordination planner 60 divides the query processing into two phases: query planning or preparation phase and a query execution phase. During the query preparation phase, the coordination planner 60 interacts with components in order to identify and plan the operations associated with each component involved in the query preparation process, and to determine the sequence of these operations. The coordination planner 60 may use one or more query operation providers 50 during the query preparation phase. During the query execution phase, the coordination planner 60 distributes the query operations to associated query operation providers 50. The coordination planner 60 invokes the query operations in the sequence determined at the preparation phase.

During the preparation phase, the coordination planner 60 converts a user request received from the data analyzing system 30 into a converted query or a query framework (QF) query. A QF query plays the role of a query specification that the query operation providers 50 use to communicate to each other and to the coordination planner 60 within the query framework system 10. The QF query definition is an extension of the user request specification defined by the data analyzing system 30. The coordination planner 60 and the query framework system 10 are further described in Canadian patent application 2,518,902 entitled "System and method for query planning and execution" which is hereby incorporated by reference.

Each query operation provider 50 is capable of performing a specific operation on queries. The query operation providers 50 include a relational query provider 52, OLAP query provider 54, a cube build provider 56 and the multidimensional operation provider 100. There may be more query operation providers in the query framework system 10.

The relational query provider 52 is capable of processing relational queries. It provides tabular operations to received queries. The operation of the relational query provider 52 involves translation of the system query language into the query language of underling data sources 32, such as SQL.

The OLAP query provider 54 is capable of processing OLAP queries, i.e. queries of the system query language involving OLAP operations only. The operation of the OLAP query provider 54 uses summary information built into a cube structure.

The cube build provider 56 is responsible for the cube build operation. This operation is expressed with a provider query that contains the structure of the cube to be built and the mapping of cube elements to columns of an input data stream populating the cube content. The cube build provider 56 also encapsulates the cube caching functionality for caching dynamic cubes.

The multidimensional operation provider 100 is a query transformation component plugged into the query framework system 10 governed by the coordination planner 60. A transformation provider is responsible for preprocessing of the received user request, and transforms the received user request into a QF query in order, for example, to make it simpler or supported by other components in the query framework system 10.

The multidimensional operation provider 100 uses a query decomposition process that bridges between functionality available in relational operations and multidimensional operations. It allows multidimensional functions against relational data sources and operations requiring transformation of a cube structure against multidimensional data sources.

The multidimensional operation provider 100 plays part in data agnostic user experience, e.g., the same look and feel against relational and multidimensional data sources, including the set of functions shared across multidimensional and relational data sources. The multidimensional operation provider 100 allows the relational and multidimensional operations combined in a single query. In this embodiment, the logic of the query decomposition is implemented as a multidimensional operation provider 100 which is a pluggable component in the query framework system 10. Accordingly, its functionality can be reused for different variations of data sources. Also, its behavior may be tweaked in the system 10 by pre-processing incoming queries or post-processing the results of the decomposition. In a different embodiment, the functionality of the multidimensional operation provider 100 may be incorporated into other component.

Figure 3:
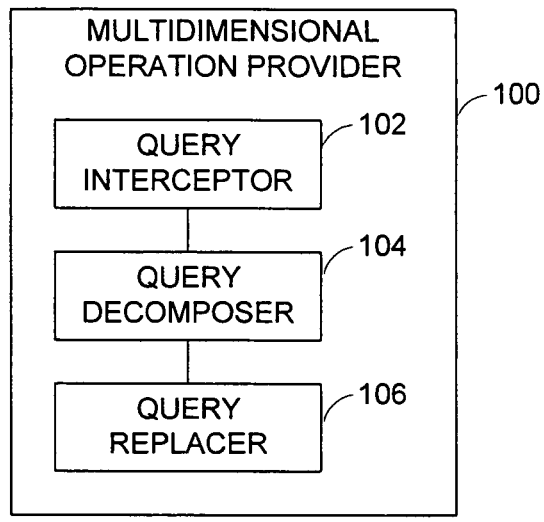
FIG. 3 is a block diagram showing a multidimensional operation provider in accordance with an embodiment of the present invention.

As shown in FIG. 3, the multidimensional operation provider 100 has a query interceptor 102, query decomposer 104, and a query replacer 106. The query interceptor 102 detects and intercepts queries requiring its involvement, the main type of which is multidimensional queries issued against relational data sources 32. The query decomposer 104 decomposes these queries into multiple sub-queries or specifications, as further described below. The query replacer 106 replaces the initial query with the stack operations expressed with the multiple specifications.

Figure 4:
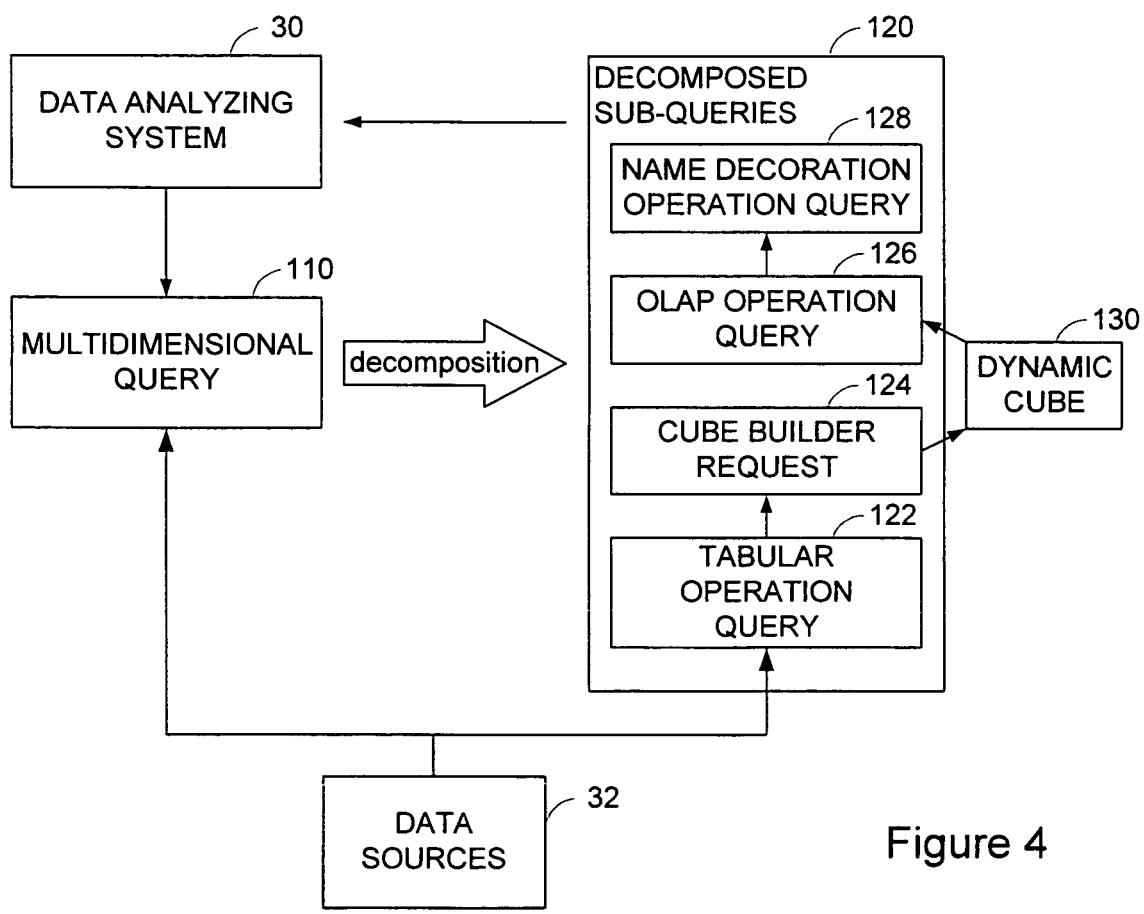
FIG. 4 is a diagram schematically showing decomposition of a multidimensional query.

FIG. 4 schematically illustrates an example of decomposition of a multidimensional query 110 intercepted by the multidimensional operation provider 100. The multidimensional query 110 is decomposed into multiple specifications 120 including four specifications representing four types of sub-queries 120. The sub-queries 120 include a tabular operation query 122, a cube build provider query 124, an OLAP operation query 126, and a unique name decoration operation query 128. The tabular operation query 122 has a QF query specification that involves only relational operations. This query 122 is sent to the relational query provider 52 for execution. The cube builder request 124 has a specification for a dynamic cube 130 to be handled by the cube build provider 56. The OLAP operation query 126 has a QF query specification that is applicable against the dynamic cube 130. This query 126 is sent to the OLAP query provider 54 for execution. The unique name decoration operation query 128 is a query representing an operation of adjusting member/level unique names to correspond to multidimensional structure expressed in the metadata model rather than the structure of the dynamic cube. The unique name decoration operation is handled by the multidimensional operation provider 100 itself.

In the example shown in FIG. 4, the multidimensional query is decomposed into four sub-queries or specifications. A different multidimensional query may be decomposed differently into fewer or more sub-queries, depending on operations contained in the multidimensional query.

Figures 5, 6:
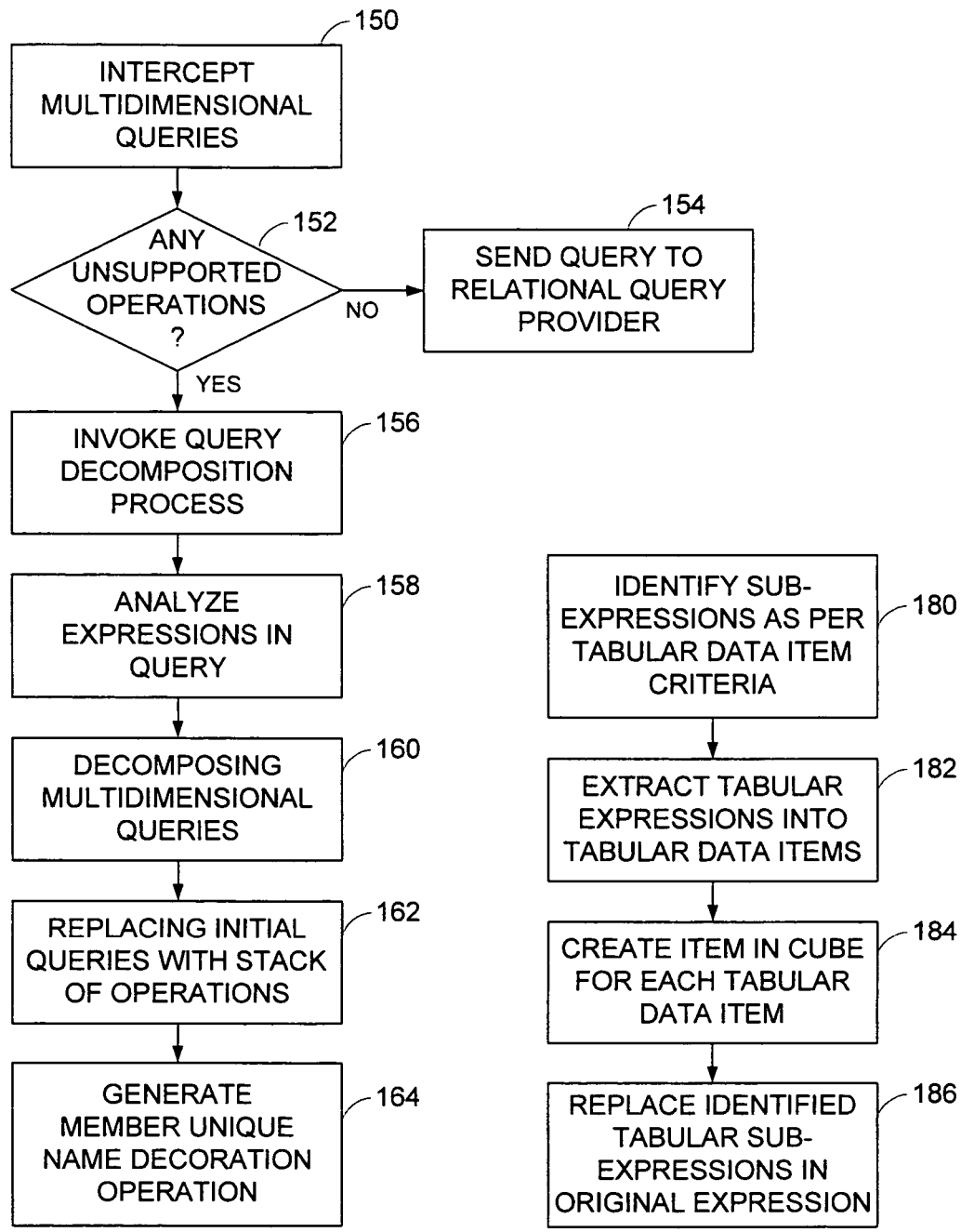
FIG. 5 is a flowchart showing the operation of the multidimensional operation provider.
FIG. 6 is a flowchart showing a decomposition process by the multidimensional operation provider.

Referring to FIG. 5, the operation of the multidimensional operation provider 100 and the decomposition rules are described. The multidimensional operation provider 100 detects and intercepts a multidimensional query issued against the relational data sources 32 (150). The multidimensional operation provider 100 checks if the multidimensional query involves operations that are unsupported by the relational query provider 52 (152). To determine if the operations are unsupported, the multidimensional operation provider 100 may use the operation support table 16 to refer to the functionalities that are supported by the relational query provider 52. If all operations involved in the multidimensional query are supported by the relational query provider 52, the query is sent to the relational query provider 52 (154) by the coordination planner 60 for execution.

If the multidimensional query involves one or more operations that are unsupported by the relational query provider 52, the multidimensional operation provider 100 invokes the query decomposer 104 to decompose the multidimensional query (156). The query decomposer 104 analyses each expression included in the multidimensional query (158). The analysis is performed in the context of the query result structure element from which the expression is referenced. Items in a query result have different roles. The main distinction is between valueset items and items associated with them. The valueset items drive the set of rows on a list query result or rows on an edge of a crosstab query result. Associated items are expected to return a single value in a row based on the corresponding valueset item. The roles of the items are defined by the context from which these items are referenced, i.e. there are different sections in the query result definition for valueset and associated with them items.

The query decomposer 104 decomposes expressions in the multidimensional query. An expression is decomposed into a multidimensional sub-expression and one or more relational sub-expressions (160), as further described below.

The query replacer 106 of the multidimensional operation provider 100 replaces the initial multidimensional query with stack operations (162) based on the results of the decomposition of the query at step 160. Each operation is sent to a respective query provider 52, 54 by the coordination planner 60 for planning and execution.

The multidimensional operation provider 100 may also perform the member unique name decoration operation (164) if appropriate. The member unique name decoration operation is carried out based on the mapping of the model items referenced in the tabular expressions to cube items in those cases where tabular expressions contain only model references and no operations applied to them. For tabular items involving some operations on top of the model references, the multidimensional operation provider 100 reports the member unique names as NULL values to the data analyzing system 30.

Figure 7:
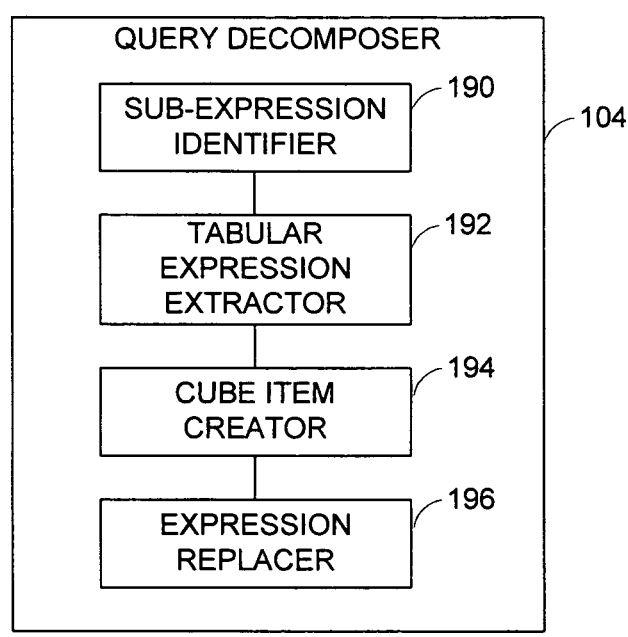
FIG. 7 is a block diagram showing a query decomposer in accordance with an embodiment of the invention.

To perform the decomposition of expressions at step 160, as shown in FIG. 7, the query decomposer 104 may have a sub-expression identifier 190, a tabular expression extractor 192, a cube item creator 194, and an expression replacer 196. The sub-expression identifier 190 identifies one or more parts of expressions in the query that meet the criteria of the tabular data items. The tabular expression extractor 192 extracts tabular sub-expressions into tabular data items. The cube item creator 194 creates a cube item in a dynamic cube 130 for each tabular data item. The cube item creator 194 uses a dynamic cube cacher that allows caching of the dynamic cube 130. The expression replacer 196 replaces the identified tabular sub-expressions with references to the corresponding cube items. The query decomposer 104 may also have a name decoration operator 198 for member unique name decoration operations.

The decomposition may be carried out as shown in FIG. 6. The query decomposer 104 identifies one or more parts of expressions, i.e., sub-expressions, as supported by a relational query provider 52 using tabular data item criteria (180). Tabular data item criteria include the operations that can be pushed to a tabular data item. Operations of this type are described by a "tabular query" operation support table. The "tabular query" operation support table includes all the operations that are natively supported by relational datasources, for example, table columns, arithmetical, Logical, and Boolean operators; and relational functions such as functions operating on one or more values (in-row functions), and aggregation functions operating on measure values. It also allows for references to levels and level attributes which make base of the tabular query expressions against multidimensional datasources. An expression reference to a member unique name is considered to be a combination of level reference and the qualifier of a member path. The query decomposer 104 extracts a level reference into a tabular operation query (182). The qualifier of a member path is left for OLAP query sub-expression. Relational sub-expressions are included in the tabular operation query 122, which in the process of further planning phase processing gets associated with the relational query provider 52. The tabular operation query 122 is a flat list query that is a collection of all sub-expressions created as a result of decomposition of all individual expressions. The query decomposer 104 creates a cube item in a dynamic cube for each tabular data item (184). In the optimization mode of a cube size minimization, cube items representing cube measures can generate multiple tabular data items corresponding to the rollups of this measure. Every such item represents a granularity of rollup aggregation participating in the request result. When this optimization is not enabled, only a single data item corresponding to a lowest cube rollup granularity is generated for per a cube measure. The rollup values are calculated as part of cube building operation. The exception of the latter option are the aggregation types that cannot be expressed with standard cube rollup types, for example, count (distinct) aggregation that required and access to detail data and hence has to be pushed to the tabular operation query 122.

While the query decomposer 104 extracts the identified tabular sub-expressions into tabular data items (182), the query decomposer 104 also takes care of data item aggregation. Data item aggregation is either driven by aggregation attributes specified for the original expression if the whole expression is tabular, or by the content of the tabular data item in accordance with default aggregation rules of the data query framework system 10.

Created tabular data items comprise a tabular operation query 122. This query is built to be flat and does not contain any grouping.

While the query decomposer 104 creates a cube item in a dynamic cube 130 for each tabular data item (184), it determines the role of the created cube item, e.g., its level key or level attribute or measure, in accordance with the cube construction rules. The cube construction rules may include the following rules. If an origination user request expressions is completely pushed to a tabular query, then the rollup aggregation type if assigned will drive its role in a cube. If the rollup aggregation type is "none", then the item will be associated with a level in a dynamic cube. For any other rollup aggregation type the data item will be marked as a measure. In case an item does not have explicitly assigned rollup aggregation type, its role in a cube will be based on the following rules. If a tabular item sub-expression corresponding to a given cube item is found to contain references to model measures or items having "Fact" usage, then the cube item is marked to be a measure with and rollup type derived from the context of the data item expression. If a tabular item expression corresponding to a given cube item contains only a reference to a model level or to a model item that belongs to a model level and hence it belongs to a hierarchy and a dimension, then the definition of the referenced model dimension stripped to levels referenced in the query is included in the dynamic cube structure. Otherwise the location of query result structure element, from where the cube item is referenced, drives the role of the item in the dimension structure of the dynamic cube 130. In the dynamic cube 130, each path of the item nesting comprises a hierarchy. Hierarchies created under the same query edge belong to the same dynamic cube dimension.

The query decomposer 104 then replaces the identified tabular sub-expressions in the original expression with references to the corresponding cube items (186). This results in transformation of the original expression into sub-expressions that are used for an OLAP operation query 126 (FIG. 4). The OLAP operation query result definition reproduces the structure of the original query.

An example of software implementation of the multidimensional operation provider 100, MDOperationProvider, in accordance with an embodiment of the invention is now described. In this embodiment, the query framework system 10 receives from the data analyzing system 30 a user request that has a <queryResultDefinition> section. Each expression in the user request is analyzed in the context of the <queryResultDefinition> section of the user request.

A QF query is denoted as QFQuery. QFQuery is the query specification used for communication between the coordination planner 60 and the query operation providers 50. QFQuery reflects the logical representation of a query specification at any step of the query planning process. The final version of QFQuery represents the query execution plan. The benefits of using QFQuery include that it allows reusing of existing specification and its interpretation rules, and leaving the choice to a planner provider to consume either high level or simplified (transformed) constructs of renditions of the user request.

The invocation of the MDOperationProvider component is triggered by various factors. The MDOperationProvider component is invoked when a QFQuery is posed against a relational datasource and the number of edges/dimensions in QFQuery is greater than one. It indicates that the pivoting operation is to be performed on top of a relational datasource, which currently means that a dynamic cube has to be built.

The MDOperationProvider component is also invoked when calculated members are defined as part of a QFQuery against a relational datasource. Majority of the calculated members represent cross-row calculations, results of which populate an extra row in a resultset. Such calculation functionality is hard to translate to SQL and thus QFQuery cannot be executed by the relational provider 52. As calculated members are basic features for the OLAP query provider 54, the MDOperationProvider component pushes those calculated members to the OLAP query provider 54.

The MDOperationProvider component is also invoked when multidimensional expressions exist in the QFQuery. An expression is considered to contain multidimensional features when the expression contains a reference to a member or a query item resulting in a member, or reference to a type-in member set or a query item resulting in a member set. When an expression contains OLAP functions, the expression is also considered as a multidimensional expression. OLAP functions may be identified as such by either special property in the description of this function, or any function that have member or a member set as its parameters. OLAP functions handled in ROLAP case are recognized as OLAP functions by the special property in the description.

The MDOperationProvider component is also invoked when the OLAP union function is implied by the specified query result structure, where results of two or more expressions are requested to be collected along one edge at the same level of item nesting.

The MDOperationProvider component is also invoked when caching of relational results exists in a dynamic cube 130. Some caching strategies may choose to request more data from the relational query provider 52 and build larger cube than requested in a query. Certain list queries may be redirected against a cached dynamic cube.

Some cases of multidimensional expressions may be translated into an appropriate SQL. Those expressions include a member reference, union/set of references to members from the same level which may be extended to a hierarchy, and OLAP functions, such as Children( ), Parent( ), and Ancestor( ). These cases may be recognized and transformed by the MDOperationProvider component into relational equivalents, or passed to the relational query provider 52 as is.

When QFQuery includes a part containing a slicer, the slicer expression, i.e. a tuple of members, is decomposed as any other expression in a user request. Hence only the levels of members referenced in the slicer are pushed into the tabular operation query 122 and included into a dynamic cube 130. The slicer as an operation is left for OLAP operation query 126.

When QFQuery includes a part containing a filter implied by a member reference, the portion of the member reference semantics that can be pushed to the tabular operation query 122 may be considered in terms of the pre- or post-aggregation filtering that the member reference implies. A set of member references may comprise a set of post-aggregation conditions joined by "OR" logical operation, as described below.

When QFQuery includes a detail filter it is completely pushed into the tabular operation query 122. Thus, the detail filter is restricted to contain only operations meeting tabular data item criteria.

When QFQuery includes a part containing a summary filter, i.e., post aggregation filter, this filter is normally to be pushed to the OLAP operation query 126 as it is supposed to be applied once all cube rollups are computed. A cube size minimization optimization may be applied that pushes the summary filter into the tabular operation query 122 and compute the rollup aggregations for the aggregation granularities requested in a query as part of a tabular operation query 122.

An example of such a summary filter is a crosstab query selecting

[Country].[Country] item with its total projected on rows,
[OrderMethod].[OrderMethod] item with its total projected on columns,
[SalesOrder].[Quantity] projected on cells with the post-aggregation filter:

[Country].[Country]="Canada" or [Country].[Country]="US"

This filter should not change the total computed for all Countries. This condition may be pushed to an SQL statement, but may require computing Country rollup for every Order Method and for report total as part of the SQL statement (in an extra column of tabular result), rather than calculating this rollup as part of the dynamic cube 130 built. If the next query comes with the filter:

[ns].[Country].[Country]="Canada" or [ns].[Country].[Country]="France"

the SQL statement generated previously would have to be regenerated and the whole query would have to be re-executed. It is desirable to push summary filters to the relational query provider 52 when it can significantly reduce the cube size and amount of fetching.

When QFQuery does not request detail data and only requests data starting from the lowest granularity of aggregation, the MDOperationProvider component identifies the part of QFQuery expressing the lowest granularity, and passes it to the tabular operation query 122 in order to decrease amount of data to be fetched.

When QFQuery includes a part containing a granularity of aggregation for a measure that cannot be reduced to simple rollup types, the MDOperationProvider component identifies the part of QFQuery, and passes it to the relational query provider 52. Examples of these rollups are: Count (distinct . . . ) and other aggregations involving/implying AT clause. When a post-aggregation filter is pushed to the tabular operation query 122, the resultset received from the relational query provider 52 may not contain enough data in order to compute correct rollup values when constructing the cube 130. In that case, the necessary data may be computed as part of the tabular operation query.

When QFQuery includes a part containing a sub-expressions meeting tabular data item criteria, the MDOperationProvider component identifies the part of QFQuery, and passes it to the tabular operation query 122. The MDOperationProvider component extracts those tabular sub-expressions, as described above.

Examples of business functions handling by the MDOperationProvider component are now described. Many business functions when being applied to measures may be expressed with a relational expression. For example, Table 1 shows a business function Percent( ) applied to Revenue and Cost measures.

TABLE 1

|  | Revenue | Cost | Percent(Revenue, Cost) |
|---|---|---|---|
| Outdoor Products | 879516 | 605470 | 145.26% |
| GO Sport Line | 301670 | 145628 | 207.15% |
| Environmental Line | 1081791 | 328467 | 329.35% |
| All Products | 2262977 | 1079565 | 209.62% |

This business function may be expressed as an item of "calculated" aggregation type with the expression:

[Revenue]/[Cost]*100

In contrast, the same function applied to members does not fit the functionality of the relational query provider 52, as shown in Table 2.

TABLE 2

|  | Revenue | Cost |
|---|---|---|
| GO Sport Line | 301670 | 145628 |
| Environmental Line | 1081791 | 328467 |
| Percent(GO Sport Line, Environmental Line) | 27.89% | 44.34% |

This observation is consistent with the fact that calculations between members are not easy to represent in an SQL specification, whereas calculations involving measures can normally be pushed to the relational query provider 52. Therefore, the MDOperationProvider component pushes business functions applied to measures to the tabular operation query 122, but does not push business functions applied to members to the tabular operation query 122. The MDOperationProvider component decompose QFQuery with business function applied to members to a cube builder request 124 and an OLAP operation query 126 extracting only level references into the tabular operation query 122.

The MDOperationProvider component also does not push function arguments crossing level boundaries to the relational query provider 52. For example, Table 3 shows an example of a report having columns of Accumulate and Rank.

TABLE 3

|  |  | Revenue | Accumulate (Revenue) | Rank (Revenue) |
|---|---|---|---|---|
| Outdoor Products | Tents | 564589 | 564589 | 4 |
|  | Back Packs | 29024 | 593613 | 15 |
|  | Cooking Equipment | 193880 | 787493 | 10 |
|  | Sleeping Bags | 92023 | 879516 | 12 |
|  | Outdoor Products | 879516 | 1759032 | 3 |
| GO Sport Line | Carry-Bags | 254037 | 2013069 | 8 |
|  | Sport Wear | 47633 | 2060702 | 14 |
|  | GO Sport Line | 301670 | 2362372 | 6 |
| Environmental Line | Recycled Products | 56863 | 2419235 | 13 |
|  | Sunblock | 231135 | 2650370 | 9 |
|  | Alert Devices | 118941 | 2769311 | 11 |
|  | Water Purifiers | 417935 | 3187246 | 5 |
|  | Bio-Friendly Soaps | 256917 | 3444163 | 7 |
|  | Environmental Line | 1081791 | 4525954 | 2 |
| All Products |  | 2262977 | 6788931 | 1 |

Both Accumulate (analog of Running-Total( )) and Rank are calculated in the scope mixing Product Lines with Product Types. These business functions do not have a simple SQL equivalent, and thus, the MDOperationProvider component does not push them to the relational query provider 52. The MDOperationProvider component pushes them into the OLAP operation query 126.

The MDOperationProvider component may interact with the relational query provider 52 in several different ways.

The MDOperationProvider component may be completely responsible for handling multidimensional features against relational data sources, including performance of these features. The MDOperationProvider functionality is located in a single place. There is no need to use repeating code handling multidimensional features. Thus, this approach allows better coordination between caching, compared to a case where this functionality is fetched from multiple places.

Rather than assigning complete responsibility for handling multidimensional features to the MDOperationProvider component, the responsibility may be first given to the relational query provider 52. In this approach, a query against relational data sources is sent to the relational query provider 52 which has a first crack at the query to see if it can convert it into an SQL specification. The relational query provider 52 then returns the query if it is not able to convert it into any SQL specification. The MDOperationProvider component receives the returned query, and then applies the MDOperationProvider query transformations to decompose the query into sub-queries. Then, the MDOperationProvider component sends any relational operation query 126 of the decomposed query back to the relational query provider 52.

In another approach, the MDOperationProvider component may use an operation support table 16 of the query framework system 10 that describes functionalities of the relational query provider 52. The operation support table may include those multidimensional operations/query patterns that are known to be unsupported by the relational query provider 52. The use of such an operation support table 16 allows to eliminate one of two iterations in query planning process in the above approach. Also, it simplifies the relational query provider implementation of multidimensional functionality because it has to handle only those multidimensional operations/query patterns that are described in the operation support table 16 as supported.

The output of the MDOperationProvider component normally contains four parts: QFQuery 122 which can be pushed to the provider of the tabular result set, <providerQuery> 124 expressing the cube build operation, QFQuery 126 that can be pushed to the OLAP query provider 54 applied to the dynamic cube 130, and the <providerQuery> expression the operation of member unique name decoration. In special cases the output of the MDOperationProvider component may contain only the first tabular operation query part 122. In the case when appropriate cube sits already in the cache, the MDOperationProvider component may contain only OLAP provider query part 126.

The <providerQuery> represents an executable operation reflecting the definition of the QFQuery part that the <providerQuery> replaces. At the final stage of the planning process phase, the coordination planner 60 has converted QFQuery to contain only nodes of this type. Every <providerQuery> node in the final stage of QFQuery is sent to the corresponding providers 50 by the coordination planner 60 during execution phase of the query processing.

Each component 50, 60 participating in the planning sequence provides a query Prepare( ) method. Each provider 50 with which provider queries can be associated provides a query execution method.

The Prepare( ) method is a provider application program interface (API) method introduced for communication between the coordination planner 60 and installed providers 50 during the planning phase of the query processing.

The Prepare( ) method causes the providers 50 to create an execution plan associated with the query, and returns the description of the multidimensional structure of the result data stream. The input parameters of the Prepare( ) method are the QFQuery assigned to the provider 50, and the actual values of the request parameters. The output parameter is a response Document Object Model (DOM) structure.

The multidimensional operation provider and the query decomposer of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal and its carrier are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

What is claimed is:

1. A method of processing a multidimensional query against one or more data sources, the method comprising:
    detecting and intercepting a multidimensional query that is issued against one or more relational data sources, the multidimensional query involving one or more multidimensional expressions; and
    decomposing, with a computer system, the multidimensional query, wherein decomposing the multidimensional query comprises:
        identifying one or more sub-expressions in the multidimensional query as one or more tabular sub-expressions that are supported by a relational query provider;
        extracting the one or more tabular sub-expressions into one or more tabular data items;
        creating one or more cube items in a dynamic cube for the one or more tabular data items, wherein creating the one or more cube items comprises creating a respective cube item in the dynamic cube for each of the one or more tabular data items; and
        replacing each of the one or more tabular sub-expressions in the multidimensional query with one or more references to one or more of the one or more cube items to generate a decomposed sub-query.

2. The method as recited in claim 1, wherein the method further comprises allowing the decomposed multidimensional query to be sent to an Online Analytical Processing (OLAP) query provider that is capable of executing multidimensional query operations.

3. The method as recited in claim 2, wherein decomposing the multidimensional query further comprises creating a tabular operation sub-query based on the one or more tabular sub-expressions supported by the relational query provider.

4. The method as recited in claim 3, wherein the relational query provider is capable of executing the one or more tabular sub-expressions against one or more relational data sources.

5. The method as recited in claim 1 wherein creating the one or more cube items comprises allowing caching of the dynamic cube.

6. The method as recited in claim 1, wherein decomposing the multidimensional query further comprises performing member unique name decoration operations.

7. The method as recited in claim 3 wherein decomposing the multidimensional query further comprises using an operation support table describing operations supported by the relational query provider.

8. A method of decomposing a multidimensional query applied against one or more relational data sources, the method comprising:
 identifying one or more sub-expressions in a multidimensional query as one or more tabular sub-expressions that are supported by a relational query provider, wherein the multidimensional query involves one or more multidimensional expressions;
 extracting the one or more tabular sub-expressions into one or more tabular data items;
 creating, with a computer system, one or more cube items in a dynamic cube for the one or more tabular data items, wherein creating the one or more cube items comprises creating a respective cube item in the dynamic cube for each of the one or more tabular data items; and
 replacing the one or more tabular sub-expressions in the multidimensional query with one or more references to one or more of the one or more cube items to generate a decomposed sub-query.

9. The method as recited in claim 8, wherein identifying the one or more sub-expressions comprises using tabular data item criteria including operations that are pushable to a tabular data item to identify the one or more sub-expressions.

10. The method as recited in claim 8, wherein extracting the one or more tabular sub-expressions comprises performing data item aggregation.

11. The method as recited in claim 8, wherein creating the one or more cube items comprises determining a role of the created cube item in accordance with predetermined cube construction rules.

12. The method as recited in claim 8, wherein the replacing the one or more tabular sub-expressions comprises creating an Online Analytical Processing (OLAP) operation sub-query that is executable by an OLAP query driver.

13. The method as recited in claim 8, further comprising performing member unique name decoration operations.

14. The method as recited in claim 1, wherein decomposing the multidimensional query comprises decomposing expressions in the multidimensional query into one or more multidimensional expressions and one or more relational expressions, wherein the method further comprises replacing the multidimensional query with a stack of operations expressed by the decomposed multidimensional expressions and the relational expressions.

15. A computer system comprising:
 a query interceptor detecting and intercepting a multidimensional query that is issued against one or more relational data sources, wherein the multidimensional query involves one or more multidimensional expressions;
 a query decomposer decomposing the multidimensional query, wherein the query decomposer comprises:
  a sub-expression identifier identifying one or more sub-expressions in the multidimensional query as one or more tabular sub-expressions that are supported by a relational query provider;
  a tabular expression extractor extracting the one or more tabular sub-expressions into one or more tabular data items;
  a cube item creator creating one or more cube items in a dynamic cube for the one or more tabular data items, wherein the cube item creator creates a respective cube item in the dynamic cube for each of the one or more tabular data items; and
  an expression replacer replacing the one or more tabular sub-expressions in the multidimensional query with one or more references to one or more of the one or more cube items to generate a decomposed sub-query.

16. The computer system as recited in claim 15, wherein the query decomposer decomposes expressions in the multidimensional query into one or more multidimensional expressions and one or more relational expressions, wherein the multidimensional operation provider further comprises a query replacer replacing the multidimensional query with a stack of operations expressed by the decomposed multidimensional expressions and the relational expressions.

17. The computer system as recited in claim 16, wherein the query replacer allows operations expressed by the decomposed multidimensional expressions to be sent to an Online Analytical Processing (OLAP) query provider that is capable of executing multidimensional query operations, and operations expressed by the decomposed relational expressions to be sent to a relational query provider that is capable of executing relational query operations.

18. The computer system as recited in claim 15, wherein the sub-expression identifier creates a tabular operation sub-query based on the sub-expressions that are supported by the relational query provider.

19. The computer system as recited in claim 15, wherein the cube item creator uses a dynamic cube cacher that allows caching of the dynamic cube.

20. The computer system as recited in claim 15, wherein the query decomposer further comprises a name decoration operator for performing member unique name decoration operations.

21. The computer system as recited in claim 15, wherein the query decomposer uses an operation support table describing operations supported by the relational query provider.

22. A computer system comprising:
 a sub-expression identifier identifying one or more sub-expressions in the multidimensional query as one or more tabular sub-expressions that are supported by a relational query provider, wherein the multidimensional query involves one or more multidimensional expressions;
 a tabular expression extractor extracting the one or more tabular sub-expressions into one or more tabular data items;
 a cube item creator creating one or more cube items in a dynamic cube for the one or more tabular data items, wherein the cube item creator creates a respective cube item in the dynamic cube for each of the one or more tabular data items; and
 an expression replacer replacing the one or more tabular sub-expressions in the multidimensional query with one or more references to one or more of the one or more cube items to generate a decomposed sub-query.

23. The computer system as recited in claim 22, wherein the cube item creator uses a dynamic cube cacher that allows caching of the dynamic cube.

24. The computer system as recited in claim 22, wherein the query decomposer uses an operation support table describing operations supported by the relational query provider.

25. The computer system as claimed in claim 22, further comprises a name decoration operator for performing member unique name decoration operations.

26. A memory containing computer executable instructions that can be read and executed by a computer to:

detect and intercepting a multidimensional query that is issued against one or more relational data sources, the multidimensional query involving one or more multidimensional expressions; and decompose the multidimensional query, wherein the computer executable instructions that can be read and executed by the computer to decompose the multidimensional query comprise computer executable instructions that can be read and executed by the computer to:

identify one or more sub-expressions in the multidimensional query as one or more tabular sub-expressions that are supported by a relational query provider;

extract the one or more tabular sub-expressions into one or more tabular data items;

create one or more cube items in a dynamic cube for the one or more tabular data items, wherein the computer executable instructions that can be read and executed by the computer to create the one or more cube items comprise computer executable instructions that can be read and executed by the computer to create a respective cube item in the dynamic cube for each of the one or more tabular data items; and replace the one or more tabular sub-expressions in the multidimensional query with one or more references to one or more of the one or more cube items to generate a decomposed sub-query.

\* \* \* \* \*